June 9, 1925.
Re. 16,092
B. C. STICKNEY
TYPEWRITING MACHINE
Original Filed May 10, 1921 3 Sheets-Sheet 1
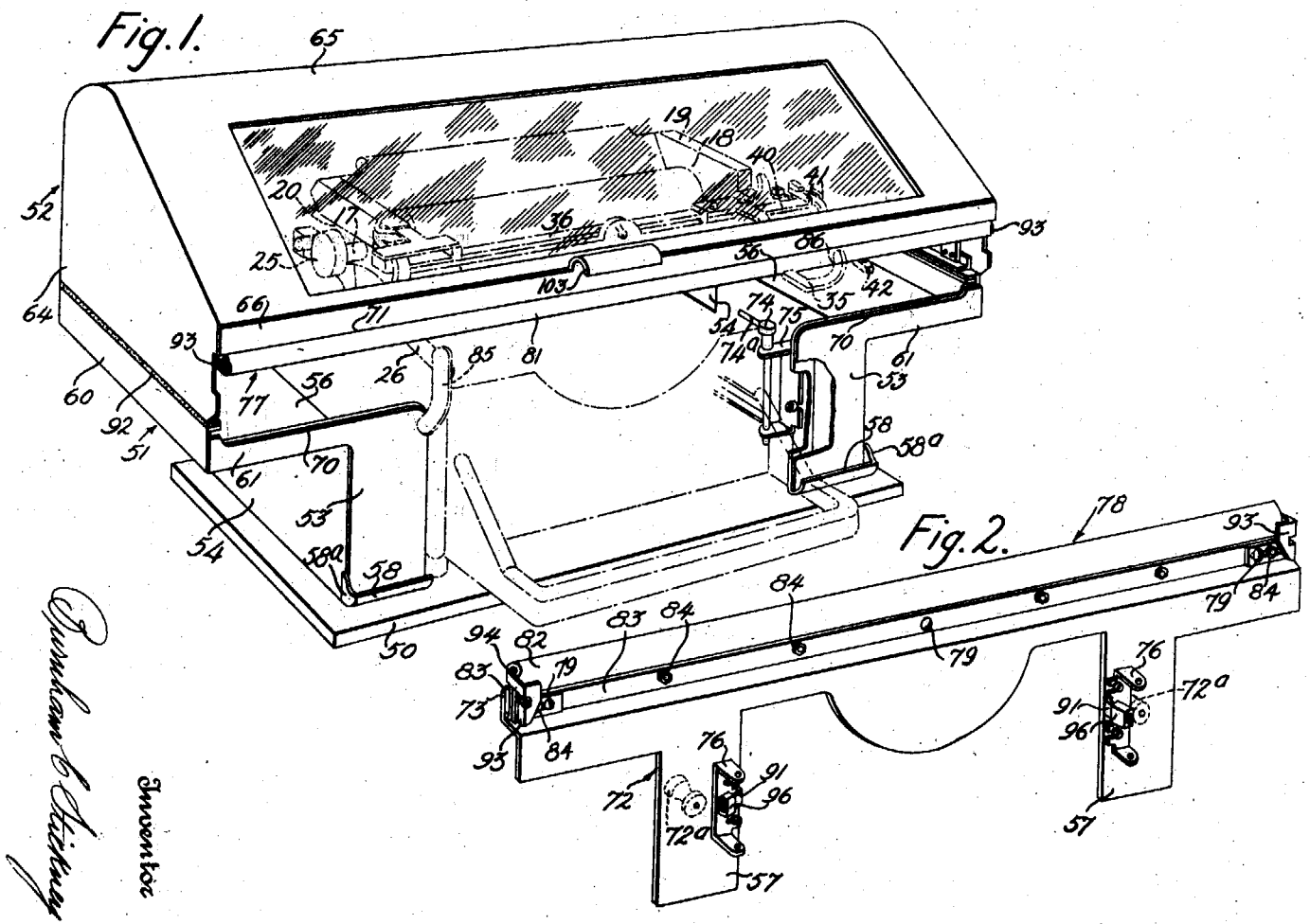
Inventor
Burnham C. Stickney June 9, 1925.

B. C. STICKNEY

Re. 16,092

TYPEWRITING MACHINE

Original Filed May 10, 1921 3 Sheets-Sheet 2

Inventor

Burnham C. Stickney

June 9, 1925.

B. C. STICKNEY

Re. 16,092

TYPEWRITING MACHINE

Original Filed May 10, 1921 3 Sheets-Sheet 3

Inventor

Burnham C. Stickney

Reissued June 9, 1925.

Re. 16,092

UNITED STATES PATENT OFFICE.

BURNHAM C. STICKNEY, OF RUTHERFORD, NEW JERSEY.

TYPEWRITING MACHINE.

Original No. 1,533,355, dated April 14, 1925, Serial No. 468,257, filed May 10, 1921. Application for reissue filed April 28, 1925. Serial No. 26,516.

*To all whom it may concern:*

Be it known that I, BURNHAM C. STICKNEY, a citizen of the United States, residing in Rutherford, in the county of Bergen and State of New Jersey, formerly residing in Elizabeth, in said State, have invented certain new and useful Improvements in Typewriting Machines, of which the following is a specification.

This invention relates to sound-deadening hoods for typewriting machines, and is of the same general type disclosed in my co-pending application, Serial No. 429,617, filed December 10, 1920 (now Patent No. 1,519,224, dated December 16, 1924).

The invention comprises, in combination with a typewriting machine having features co-operating therewith, a sound-deadening casing or hood for enclosing the noise-producing parts of the machine, while the keys and other parts of the machine used in its operation project from the hood.

The invention provides for a longitudinal slot at the front between a lower body part and an upper, rearwardly swingable, hinged cover part or dome, beneath which a plurality of finger-pieces may project from the usual carriage, which, in the present invention, may be mounted to travel within the cover part between the end walls thereof.

It is one feature of the present invention to provide an improved means for maintaining the slot in closed condition, such means comprising a pair of co-operating easily yielding cushion-strips, one of which is mounted on the lower body part just below the slot, the other of which is mounted on the cover part just above the slot, and a light resilient reinforcing means within said strips, whereby the strips offer practically no resistance to the passage of the levers along the slot, and therefore to the movement of the carriage. Said reinforcing means will restore the contact between the strips after the latter have been separated by the passage or operation of the finger-pieces projecting through the slot.

Another feature of this invention is the provision of means for transmitting the sound of the line-end bell-signal to the exterior of the sound-deadening casing, said signal being ordinarily mounted on the enclosed portion of the typewriting machine. For this purpose, a sound-transmitting tube is mounted adjacent the signal, and is extended forwardly to a point adjacent the type-keys, which extend outside of the casing.

Another feature of the invention is the provision of a detachable front for the lower body-part of the sound-deadening hood, which enables the hood to be more readily applied to a machine and the lower body part to be readily assembled, and fastening means for said detachable front, said fastening means lying wholly within the casing.

Another feature of this invention is the provision of an efficient linkage between the cover and lower body parts of the hood, which necessitates a minimum of force for raising the cover when desired.

Still another feature of this invention is the provision of an upwardly and downwardly-extending finger-piece at the forward end of a line-space lever, which enables the latter to be easily and readily operated.

Other features and advantages will hereinafter appear.

In the accompanying drawings,

Figure 1 is a perspective view of the hood applied to an Underwood standard typewriting machine as modified by the invention, the front plate and the lower body part having been removed.

Figure 2 is a perspective view, from the rear, of the front plate or the lower body part detached from the hood.

Figure 3:
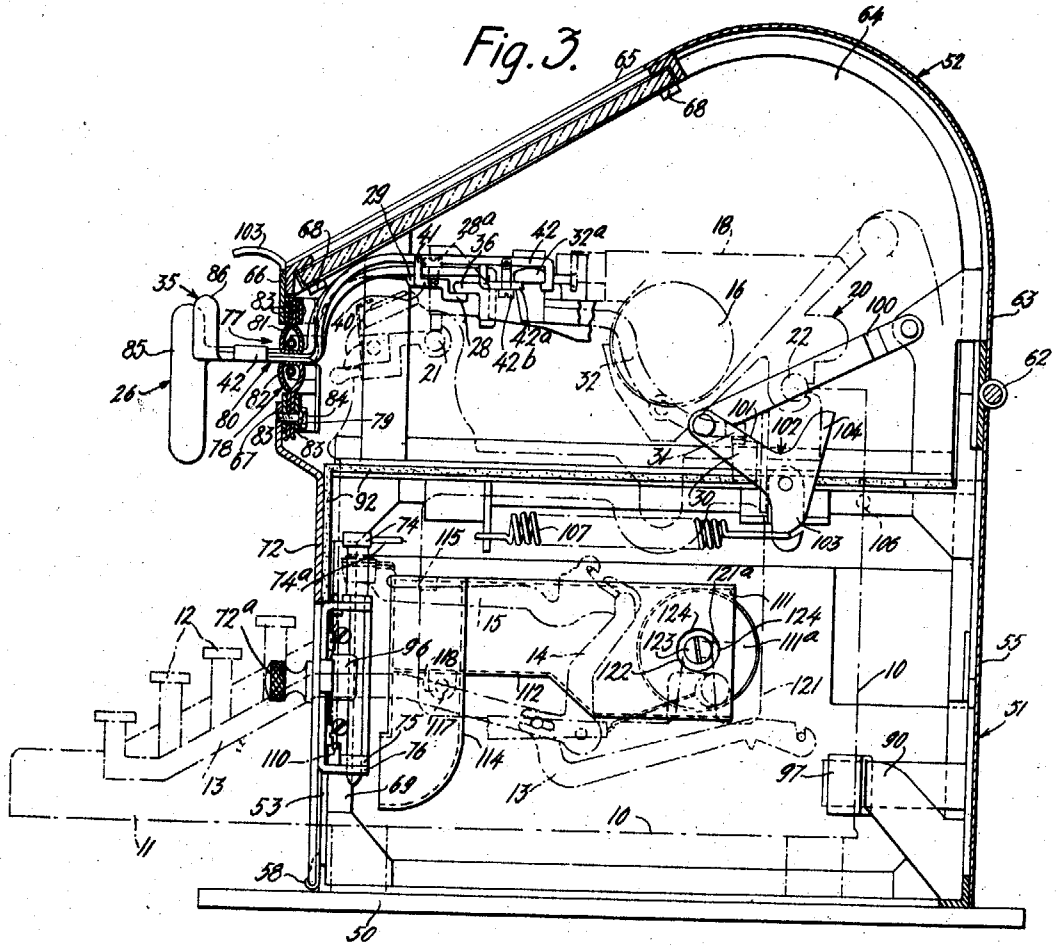
Figure 3 is a vertical section through the hood and machine.
Figure 4:
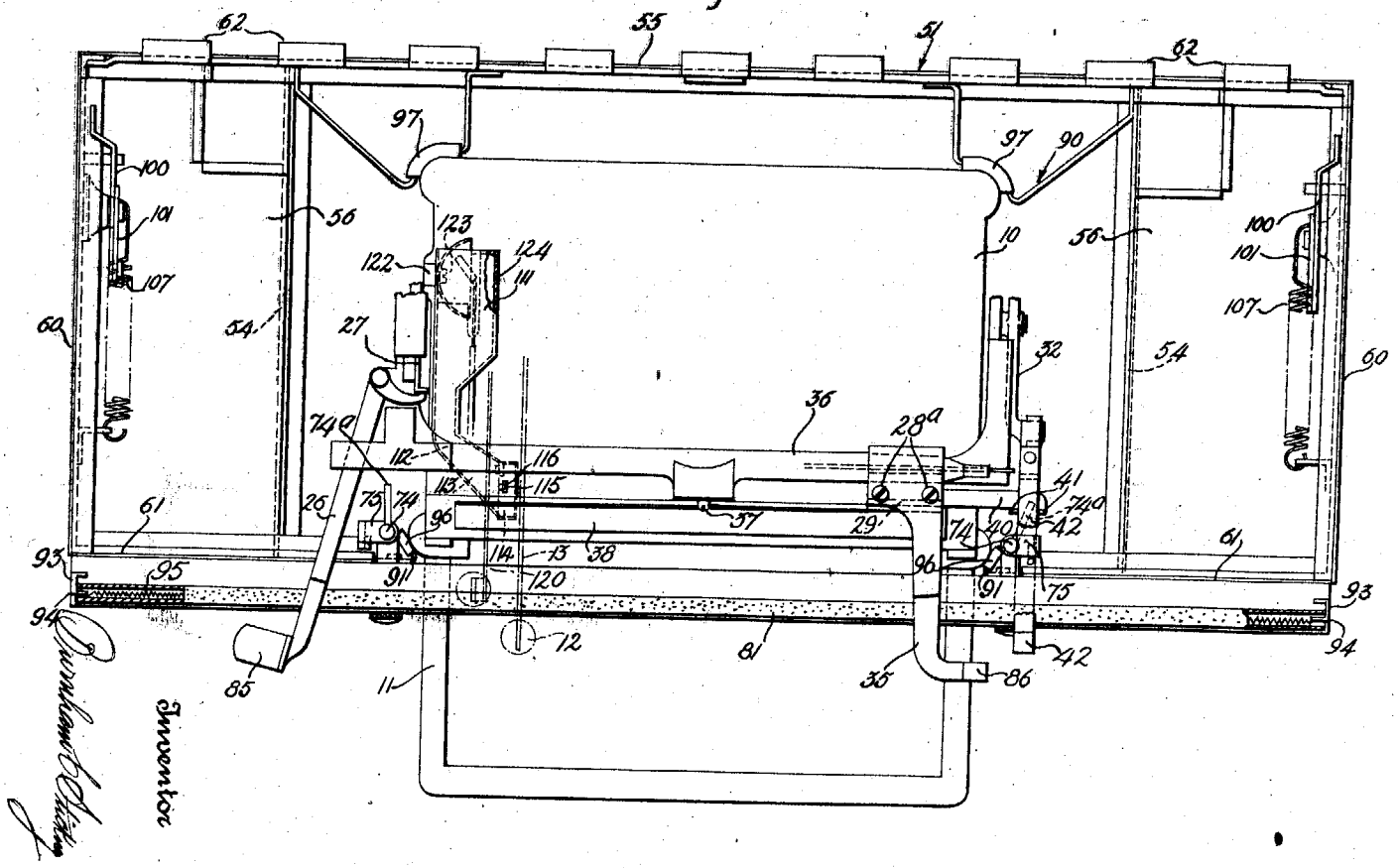
Figure 4 is a plan view of the device shown in Figure 3, the hinged cover of the hood having been removed to expose the underlying mechanism.

The Underwood standard typewriting machine comprises a main frame 10 and an extension 11 of said frame, within which extension are positioned banks of keys 12 fixed to the ends of key-levers 13, which operate bell-cranks 14 to swing the type-bars 15 upwardly and rearwardly to strike against a platen 16. Said platen is fixed upon a shaft 17 journaled in the end walls 18 of a platen-frame 19 forming part of the usual carriage 20, which rides upon front and rear rails 21 and 22 on the main frame of the machine. The platen may be rotated by the usual finger-wheels 25 fixed to the ends of shaft 17 or by the usual line-space mechanism, of which line-space handle 26 and slide 27 are shown. The carriage is fed at line-space intervals to the left by an escapement mechanism (not shown), which operates a pinion 30 in engagement with a rack 31 at the end of a lever 32, said lever projecting forwardly to form the usual carriage-release lever, to be described more fully hereinafter. A finger-piece 35 is detachably mounted on the front bar 36 of the carriage for returning the latter to the right, and is secured in place by clamping means comprising a plate 28 and screws 28[a], Figure 3, the clamp plate 28 having a rib 29 engaging under the finger-piece 35. The clamp plate may be provided with a lateral extension 40 having vertical guides 41 for guiding a forward extension or finger-piece 42, detachably mounted on the carriage-release lever 32, by means of a clamp plate 42[a] engaging a lateral extension 32[a] of the release lever 32, the clamp plate 42[a] being secured by a screw 42[b]. It will be understood that the guides 41 prevent displacement of the finger-piece 42 on the lever 32 which might otherwise be caused by a force acting sidewise on the finger-piece 42. The structure of the line-space handle 26, finger-piece 35 and extension 42 will be more fully described hereinafter, in connection with the structure of the sound-deadening hood. The carriage is provided with the usual pointer 37 co-operating with a scale 38 fixed to the main frame of the machine.

The typewriting machine rests upon a sound-deadening base-plate 50 which forms a bottom plate for the sound-deadening casing or hood, the latter comprising a lower or body portion 51 and an upper or cover portion 52. The body portion 51 comprises a front wall 53, end walls 54, and a rear wall 55, the front wall being provided with an opening large enough to receive the main typewriter frame 10. The front and side walls extend upwardly to a point below the bottom surface of the platen, the rear wall extending upwardly a greater distance, and the side walls being provided with horizontal extensions 56 at their upper ends extending to points beyond the ends of the carriage in the left and right limiting positions thereof. Vertical flanges 60 on the ends of the extensions 56 meet extensions 61 of the front wall and corresponding extensions of the rear wall to form an upper container in which the carriage travels to the right and left. The cover 52 is hingedly connected by a rear wall 63 to the rear wall 55 at 62, and comprises also side walls 64 co-operating with flanges 60, a forwardly-extending and downwardly-sloping top wall 65, which may be a continuation of the rear wall 63, and a short front wall 66 terminating some distance below the top of the carriage and considerably above the top edge 70 of the front wall 53 of the body part. The top wall 65 is provided with a transparent plate supported in any well-known manner, as by rails 68 forming grooves for sliding the plate in and out and facilitating replacement, and occupying substantially the entire top wall, thus rendering visible the typing on work-sheets around the platen. The various parts of the body part and cover part of the casing heretofore described are held together in any well-known manner, as, for instance, by angle-irons 69.

It will be apparent that the front wall 53 of the body part terminates at its top 70 a distance considerably below the lower edge 71 of the front wall 66 of the cover part, thus leaving a large opening lengthwise of the machine. There is further provided a front cover-plate 72 shaped like the front wall 53, but extending upwardly a greater distance. The upper edge 73 of the cover-plate does not reach the lower edge 71 of the front wall 66, thus leaving a slot 80 for a purpose to be hereinafter described, said slot being closed to prevent escape of sound, in a manner which will also be described hereinafter. The front cover-plate is readily attached to the front wall 53 by means of bolts 74, provided with finger-pieces 74[a], passing through vertically-aligned openings in brackets 75 fixed to the front wall 53, in any suitable manner, and through similarly aligned openings in rearwardly-extending brackets 76 fixed to the cover-plate 72, the brackets 76 co-operating with the brackets 75, so that all the openings in each set of brackets are in vertical alignment. It will be seen that the attaching means for the cover-plate lies wholly within the casing. By merely withdrawing the bolts 74, the front cover-plate may be removed and the machine withdrawn from the casing. To assist in positioning the front plate 72 when attaching the latter, containers or troughs 58 are provided at the lower ends of the front wall 53, into which the lower ends 57 of the cover-plate 72 may be set, the upper edge of said plate being first introduced behind a finger-piece 85 of the line-space handle 26. The front plate may be located laterally by portions 58[a] which close the outer ends of the troughs 58 and engage the outer edges of the ends 57 of the plate 72. To facilitate manipulation of the front plate 72, it may be provided with finger-pieces 72[a]. It should be understood that the tapered ends of the bolts 74 may serve to bring the openings in the two sets of brackets into alignment and to force the cover-plate against the front wall of the casing.

The slot 80 may be closed by means of upper and lower slot-closing units 77 and 78 comprising cushion-strips 81 and 82, respectively. Each cushion may be in the form of a fold or loop, Figure 3, and made of suitable easily yielding limp material, such as plush, felt or soft leather. The ends of the fold may be clamped between two bars or strips 83 secured to each other by bolts 84, so that the units 77 and 78 may be readily attached to the inner side of front wall 66 of the cover 52 and to the upper edge of the front plate 72, respectively, by screws 79. The cushion-strips or lips 81 and 82 meet on a line about on the level of the platen axis. It is desirable to operate the machine, that is, to line-space the platen, return the carriage to the right, and release the carriage from the rack without lifting the cover of the sound-deadening casing. Since the line-space handle 26, the carriage-return finger-piece 35, and the carriage-release-lever-extension 42 are mounted on a level with the front bar 36 of the carriage, it is necessary to curve these members downwardly and extend them forwardly, as shown, in order that they may pass through the slot 80. The line-space handle 26 is provided at its end with the large upwardly and downwardly extending finger-piece 85, rendering the operation thereof easy and pleasant to the touch, and the carriage-return finger-piece 35 has an upturned end 86 to be grasped by the operator. It will be understood from the description that the finger-piece 85 and end 86 do not interfere with the assembling of the machine, since the front cover-plate 72 is not applied until the machine is in position in the body part of the casing. The positioning of the machine is facilitated by locating members 90 fixed to the walls of the body part and by similarly functioning members 91 on the front cover-plate, said members 90 and 91 being preferably provided with cushions 96, 97, of sound-deadening material, engaging the main frame 10 of the machine at the corners thereof.

As a further means for deadening the sound, both the upper and lower parts of the casing and the meeting edges of these parts may be provided with a lining of sound-insulating material 92, such as felt.

From the above description, it will be apparent that, after the work has been positioned in the machine for typing, the cover 52 may be lowered and all the ordinary typing operations carried on without opening the casing. The handle 26, finger-piece 35, and extension 42, projecting through slot 80, press against and slightly spread easily yielding strips 81 and 82, and, in operating extension 42 to release the carriage, the lower strip is pressed downwardly. It has been found advantageous to assist the return of the distorted portions of the cushion-strips 81 and 82 after the carriage has moved to another position and especially after the extension 42 has been operated. To this end, the strips 81 and 82 are each reinforced by light resilient means which may be in the form of a helical tension spring 95 suspended at its ends by brackets 93 fixed to the rear clamping strips 83, the brackets 93 being provided with inwardly-turned arms 94 projecting into the loops of strips 81 and 82, to the ends of which arms are fixed the springs 95 which pass through the loops or cushions lengthwise thereof. As soon as a force which is applied to strip 81 or 82 is removed, as by the passage of the members projecting through slot 80, or the release of extension 42, the light resilient means within the strips 81 and 82 tend to restore the loops immediately to their initial positions in close contact with each other to avoid escape of sound. By an inspection of Figure 2, it will be seen that the brackets 93 are secured to the strips 83 by the end ones of the bolts 84. Thus, the detachable slot-closing units including the resilient members or springs may be readily replaced should the cushions become worn.

The ordinary operation of typing can thus be carried on with the carriage rapidly propelled by a weak spring with the usual uniform movement without lifting the cover and without permitting the escape of sound. However, it frequently becomes necessary to have access to the machine, as, for instance, when it is desired to insert new work-sheets in the machine or make corrections in the typed matter. It is, therefore, desirable to provide means whereby the cover may be easily opened and maintained in open position. For this purpose, a linkage is provided consisting of a link 100 pivoted at one end near the rear of the cover and at the other end to the end of one arm 101 of a bell-crank 102 pivoted on the body part of the hood, so that, by raising the cover by a finger-piece 103, link 100 is drawn rearwardly to rock arm 101 of the bell-crank rearwardly until the center of gravity of the cover has passed the pivot or hinge 62. The weight of the cover thus maintains it in rearward position, and, to limit the rearward travel of the cover, the bell-crank 102 is provided with an extension 104 of its second arm 105, said extension moving rearwardly when the cover is raised and being limited in its rearward movement by a stop 106. To facilitate the opening of the cover, a counterbalance-spring 107, fixed at one end to the body part of the hood and at the other end to arm 105, normally draws said arm forwardly to rotate arm 101 rearwardly, and thus aid in opening the cover, said spring merely counterbalancing a portion of the downward force of the cover but incapable of lifting the cover by itself.

The machine being almost entirely enclosed by the sound-deadening hood, the bell-signal, which gives a warning at the end of a line, will also be subdued. It will be noted, however, that the only access from the interior of the machine to the exterior of the hood is through the comb 110 at the front of the machine in which the type-bars operate. Means are therefore provided for carrying the sound of the bell 111[a] forwardly to the comb 110, said means comprising a tube or horn 111 terminating at the bell and having a forward extension 112 adjacent one side of the main frame 10, said extension having a bent portion 113 adjacent the front of the machine. The bell-signal is usually located not only to the rear of the comb but above it, and, to bring the tube 111 to the comb, it is therefore necessary to direct it downwardly between the type-bars, and, for this purpose, a tube 114 is inserted upwardly betweeen the outer key-lever 13 and the usual back-space key-lever 120 and is connected to tube 111 at its upper edge, preferably by a hook 115 on portion 113 engaging in a slot 116 at the upper end of tube 114, and is secured to the tube 111 by a screw 117 which passes through an ear 118 on the portion 113, the screw being threaded into the wall of the tube 114. The tube 111 may be disposed in the usual opening 121 in the left-hand side of the frame 10 and is provided with a slot 121[a], so that it may be readily slipped behind the usual bell-supporting bracket 122 and straddle the bell-holding screw 123. To facilitate the manipulation of the screw 123, the right-hand wall of the tube 111 is provided with a hole 124 through which a screw-driver may be inserted from the right-hand side of the machine. The following claims are limited to inventive organizations that are not disclosed in my co-pending application, No. 381,259, filed May 14, 1920.

Variations may be resorted to within the scope of the invention, and portions of the improvements may be used without others.

Having thus described my invention, I claim:

1. The combination with a typewriting machine, of a sound-deadening casing for the machine, said casing comprising a lower body-part and an upper cover-part hinged at the rear to said body-part, said body-part comprising a front wall, said front wall having an opening to permit the insertion of the machine in said casing, a front cover-plate releasably mounted on said front wall for closing said opening, and for pressing against the front of the machine-frame to hold the machine in position, and holding means for said cover-plate lying wholly within said casing.

2. The combination with a typewriting machine, of a sound-deadening casing for the machine, said casing comprising a lower body part and an upper cover part hinged at the rear to said body part, said body part comprising a front wall, said front wall having an opening to permit the insertion of the machine in said casing, a front cover-plate releasably mounted on said front wall for closing said opening, and for pressing against the front of the machine-frame to hold the machine in position, and fastening means for said cover-plate at each side of the opening and comprising brackets on said cover-plate, co-operating brackets on said front cover-plate, the brackets on said front wall and front cover-plate having aligned openings and a releasable bolt passing through said openings, said bolt having a tapered end so as to bring said openings into alignment and to press said cover-plate against said front wall.

3. The combination of a sound-deadening casing enclosing a typewriting machine having a carriage and a handle connected thereto, said casing having a slot through which said handle projects and along which it travels with the carriage, slot-closing means comprising yielding lips at opposite sides of the slot to contact with each other at opposite sides of said handle along the slot, an elastic tension device extending through each of said lips and tending to maintain the contacts edge thereof in effective position, and brackets adjacent the ends of each of said lips to which the ends of the corresponding tension device are attached.

4. The combination with a typewriting machine having a frame and a carriage to travel on said frame, of a sound-deadening casing for the machine, said casing comprising a lower body part and an upper cover part providing a longitudinal slot at the front between the cover part and the body part, a forwardly-extending carriage-return finger-piece fixed to said carriage and projecting through said slot, a carriage-release-lever pivoted on said carriage for movement in a vertical plane, a forward extension of said lever projecting through said slot, and means for guiding said extension in its vertical movement, said means being mounted on said carriage and acting on said lever at a considerable distance from its pivot.

5. The combination with a typewriting machine having a frame and a carriage to travel on said frame, of a sound-deadening casing for the machine, said casing comprising a lower body part and an upper cover part providing a longitudinal slot at the front between the cover part and the body part, a forwardly-extending carriage-return finger-piece fixed to said carriage and projecting through said slot, a carriage-release-lever pivoted on said carriage for movement in a vertical plane, a forward extension of said lever projecting through said slot, and means co-operating with said extension at a considerable distance from the pivot of said lever for guiding said lever in its vertical movement, said means being fixed to said carriage-return finger-piece.

6. The combination with a typewriting machine having a frame and a carriage to travel on said frame, of a sound-deadening casing for the machine, said casing comprising a lower body part and an upper cover part and providing a longitudinal slot at the front between the cover part and the body part, a forwardly-extending carriage-return finger-piece fixed to said carriage and projecting through said slot, a carriage-release-lever mounted for vertical movement, a carriage-release finger-piece clamped at its rear end to the forward end of said lever and projecting through said slot, and means for engaging said carriage-release finger-piece at a substantial distance from its rear end and guiding it in its vertical movement, said means comprising a lateral extension fixed to said carriage-release-lever, said extension having vertical projections for guiding said carriage-release finger-piece.

7. The combination with a typewriting machine having a bell signal within said machine for signaling the approach of the end of a line, of a sound-deadening casing for said machine having an opening through which projects a member for operating the machine, and means for directing the sound of said signal to said opening and through the same to the outside of the casing.

8. The combination with a typewriting machine having a frame, a comb at the front of said frame, key-levers passing through said comb, and a bell signal within said machine for signaling the approach of the end of a line, of a sound-deadening casing for said machine, said casing enclosing all of said machine with the exception of the portion comprising said comb, and means for directing the sound of said signal to a point adjacent said comb so that it may pass to the outside of said casing.

9. The combination with a typewriting machine having a frame, a comb at the front of said frame, key-levers passing through said comb, and a bell signal within said machine for signaling the approach of the end of a line, of a sound-deadening casing for said machine, said casing enclosing all of said machine with the exception of the portion comprising said comb, and means for transmitting the sound of said signal to a point adjacent said comb so that it may pass to the outside of said casing, said means comprising a tube terminating at one end adjacent said bell signal and at the other end adjacent said comb.

10. The combination with a typewriting machine having a frame, a comb at the front of said frame, key-levers passing through said comb, and a bell signal within said machine to the rear of and above said comb for signaling the approach of the end of a line, of a sound-deadening casing for said machine, said casing enclosing all of said machine with the exception of the portion comprising said comb, and means for transmitting the sound of said signal to a point adjacent said comb so that it may pass to the outside of said casing, said means comprising a tube terminating at one end adjacent said bell signal and extending forwardly, and a second tube positioned between two adjacent key-levers and terminating at one end adjacent said comb and extending upwardly, said second tube being connected to said first tube to form a continuation thereof.

11. The combination with a typewriting machine having a frame, a carriage to travel on said frame, and a finger-piece mounted on the carriage and projecting forwardly therefrom and from the front of the machine, of a sound-deadening casing for the machine, said casing having a longitudinal slot at the front through which the finger-piece projects for manipulation, and means for maintaining said slot in closed condition, said means comprising a longitudinally-folded cushion-strip on one side of the slot, a tension-spring extending through the fold of said cushion-strip to reinforce the latter, two bars between which the longitudinal edges of the cushion-strip are clamped, and brackets adjustably secured on the ends of one of said bars, the ends of said spring being attached to said brackets.

12. The combination with a typewriting machine having a signaling device to be sounded near the end of a writing line, of a sound-deadening casing for said machine, and means in the form of a horn within the casing to transmit the sound of said signaling device to the operative, said horn extending from the signaling device and having a mouth at the exterior of the casing.

13. In a typewriting machine, the combination with a casing therefor, said casing having a slot therein, of a carriage, a carriage-release-lever, a detachable finger-piece for said release-lever extending forwardly therefrom through the slot in said casing, and guiding means for the detachable finger-piece to prevent displacement thereof on the release-lever, said guiding means being mounted on the carriage and engaging said finger-piece intermediate its ends.

14. In a typewriting machine, the combination with a casing therefor, said casing having a slot therein, of a carriage, a carriage-release-lever, a detachable finger-piece for said release-lever, said finger-piece being adapted to extend from said release-lever through the slot in said casing, and a bracket on said carriage to embrace said detachable finger-piece to prevent displacement thereof on the release-lever.

15. In a typewriting machine, the combination with a casing therefor, said casing having a slot therein, of a carriage, a carriage-release-lever, a detachable finger-piece for said release-lever, said finger-piece being adapted to extend from said release-lever through the slot in said casing, a detachable carriage-return finger-piece, and means on the latter to embrace the carriage-release finger-piece to prevent displacement of the latter on the carriage-release-lever.

16. In a typewriting machine, the combination with a casing therefor, said casing having a slot therein, of a carriage, a carriage-release-lever, a detachable finger-piece for said release-lever, said finger-piece being adapted to extend from said release-lever through the slot in said casing, a carriage-return finger-piece, means comprising a clamp element to secure the carriage-return finger-piece on said carriage, and an extension on said clamp element to embrace said carriage-release finger-piece to guide the latter.

17. The combination of a sound-deadening casing enclosing a typewriting machine having a carriage and a handle connected thereto, said casing having a slot through which said handle projects and along which it travels with the carriage, slot-closing means comprising yielding lips at opposite sides of the slot to contact with each other at opposite sides of said handle along the slot, an elastic tension device extending through each of said lips and tending to maintain the contact edge thereof in effective position, brackets adjacent the ends of each of said lips to which the ends of the corresponding tension device are attached, and means for adjustably securing said brackets in different positions to adjust the tension of said tension devices.

18. A sound-deadening casing for a typewriting machine having a frame and a keyboard-extension, said casing comprising a front having an opening therein to permit the assembling of the machine and the casing, and through which projects the keyboard-extension when the machine and casing are in the proper relative position, a cover-plate for said opening, said cover-plate cut away to straddle said keyboard-extension, a trough at the bottom of the front of the casing to receive said cover-plate and position it, so that, when swung against the front, it will be properly positioned with reference to the latter, and means to fasten said cover-plate against said front.

19. The combination with a typewriting machine, of a sound-deadening casing for said machine, said casing comprising a front wall having an opening therein to permit the insertion of the machine, said opening extending to the top of said wall, a cover-plate for said opening, co-operative fastening devices on the sides of the open wall and the sides of the cover-plate, said fastening devices including a trough at the bottom edge of the open wall into which the cover-plate may be set, and bolts to hold the cover-plate against the open wall.

20. A sound-deadening casing for a typewriting machine having a frame and a keyboard-extension, said casing comprising a front wall having an opening therein to permit the assembling of the machine and the casing, and through which projects the keyboard-extension when the machine and casing are in the proper relative position, said opening extending to the top of said wall, a cover-plate for said opening, said cover-plate cut away to straddle said keyboard-extension, a trough at the bottom of the front of the casing to receive said cover-plate and position it, so that, when swung against the front, it will be properly positioned with reference to the latter, means at the sides of the cover-plate to fasten said cover-plate against said front, and provisions on the inner face of said cover-plate to engage said typewriting machine frame and assist in maintaining the proper relative positioning of the typewriting machine and the casing.

21. A sound-tube to transmit sound from a sound-signal in a typewriting machine in a sound-deadening casing to the typist.

22. A sound-tube to transmit sound from a sound-signal in a typewriting machine in a sound-deadening casing having an opening at the front through which an operating part extends, said tube extending from said signal to said opening.

23. The combination of a sound-deadening casing enclosing a typewriting machine having a carriage and a handle connected thereto, said casing having a slot through which said handle projects and along which it travels with the carriage, and practically frictionless slot-closing means comprising soft yielding lips at opposite sides of the slot to contact with each other at opposite sides of said handle along the slot, and light resilient supporting means for each of said lips and co-operating therewith near the contacting edge of the lip to resist displacement of said contacting edge, and to assist in restoring the latter instantly to normal position when released.

24. The combination of a sound-deadening casing enclosing a typewriting machine having a carriage and a handle connected thereto, said casing having a slot through which said handle projects and along which it travels with the carriage, and practically frictionless slot-closing means comprising soft yielding lips at opposite sides of the slot to contact with each other at opposite sides of said handle along the slot, each of said lips consisting of a longitudinally folded flexible strip having the fold at the contacting edge, and light resilient suspension supporting means in the fold of each of said strips, and said suspension means anchored at the ends to resist displacement of the corresponding contacting edge, and to assist in restoring the latter instantly to normal position when released.

25. The combination with a typewriting machine having a frame, a carriage to travel on said frame, and a finger-piece mounted on the carriage and projecting forwardly therefrom and from the front of the machine, of a sound-deadening casing for the machine, said casing having a longitudinal slot at the front through which the finger-piece projects for manipulation and along which it travels with the carriage, and means for weakly maintaining said slot in closed condition, said means comprising a soft cushion-strip on the casing at one side of the slot, and a light tension coiled spring extending through said cushion-strip and fastened at its ends to resist depression of the cushion-strip by the finger-piece and to assist in restoring a depressed portion of the cushion-strip instantly to normal condition when relieved of the pressure of said finger-piece.

26. The combination of a typewriting machine having a carriage and a lever therefor, a sound-deadening casing therefor, said casing having a movable cover, and being slotted longitudinally at the front for passage therethrough and movement therealong of said lever, and a cushion weakly closing said slot, said cushion comprising a fold of soft yieldable material and a light coiled spring extending longitudinally within said fold to render the cushion resilient.

27. A sound-deadening casing for typewriting machines, slotted longitudinally at the front for passage therethrough and movement therealong of an operating lever attached to the carriage of the machine within the casing, and lips each in the form of a cushion weakly closing said slot except where the lever projects therethrough, said cushion comprising a fold of soft yieldable material and a light coil spring within each fold to render the cushion resilient and having its ends anchored, and bearing only against the inside of the lip at its contact edge.

BURNHAM C. STICKNEY.

Witnesses:

JENNIE P. THORNE,
EDITH B. LIBBEY.